US004001754B2

United States Statutory Invention Registration [19]

[11] Reg. Number: H1754

Tran et al. [45] Published: Oct. 6, 1998

[54] OPTICAL GLASS FIBERS, APPARATUS AND PREPARATION USING REACTIVE VAPOR TRANSPORT AND DEPOSITION

[75] Inventors: Danh C. Tran, Bethesda, Md.; George H. Sigel, Jr., Oldwick, N.J.

[73] Assignee: United States of America, Washington, D.C.

[21] Appl. No.: 825,713

[22] Filed: Dec. 13, 1985

[51] Int. Cl.[6] ..... C03B 19/04

[52] U.S. Cl. ..... 385/142; 65/157; 65/302; 65/388; 65/404; 65/424; 65/417

*Primary Examiner*—Edward A. Miller
*Attorney, Agent, or Firm*—Robert F. Beers; William T. Ellis; Wendell R. Guffey

[57] ABSTRACT

A new method for preparing low loss multimode and monomode glass optical fibers which avoids casting or pouring the core and clad melts is disclosed. The new technique is based on a reactive-gas-transport approach which avoids contamination from absorbing impurities and scattering centers by reacting the glass melt with reactive gases which remove impurities and increase the refractive index of the fiber.

23 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REACTIVE VAPOR TRANSPORT PROCESS

REACTIVE VAPOR TRANSPORT PROCESS

CROSS SECTIONAL VIEW RVT TUBE PREFORM

INDEX PROFILE OF A RVT TUBE PREFORM

OPTICAL GLASS FIBERS, APPARATUS AND PREPARATION USING REACTIVE VAPOR TRANSPORT AND DEPOSITION

BACKGROUND OF THE INVENTION

This invention pertains to a process for producing glass fibers and more particularly to a process for producing fluoride glass fibers using a reactive vapor transport and deposition process.

At present, the casting approach is the only technique known to be used in the fabrication of glass optical fibers. The Built-In Casting process developed by Nippon Telegraph and Telephone Public Corp., Mitachi et al., Electron Lett. 17 (1981) 591, consists of pouring the cladding glass melt into a mold and then upsetting the mold to produce a cladding tube. The core melt is subsequently cast into the tube thus forming a preform. The Rotational Casting technique, developed at the Naval Research Laboratory, Tran et al., Electron Lett. 18 (1982) 657, uses rotation of the mold to produce a highly concentric and uniform glass preform. Another casting technique used in the fabrication of polymer-clad fluoride glass fibers consists of pouring the fluoride melt into a cylindrical mold to form a glass rod. The rod is then jacketed with a lower index polymer tubing such as Teflon prior to being drawn into fibers, Tran et al., Electron Lett. 19 (1983) 165.

All fluoride glass optical fibers prepared from the casting approach exhibit a wavelength independent scattering loss ranging from 5 dB/km to several hundred dB/km. Examination of these fibers revealed the formation of microcrystallites at the core-clad interface as well as large density fluctuations, striae, and bubbles in the bulk of the fiber. All of these scattering defects can be attributed to thermal variations and uneven cooling of core and clad melts which are inherent in the casting process.

U.S. Pat. No. 4,414,012 to Suto et al. discloses a process whereby fine silica powders are doped using a reactive gas containing an easily oxidizable compound for producing the dopane, an easily oxidizable silicon compound and oxygen or water vapor. The finished particles may then be used to form optical fibers. U.S. Pat. No. 4,341,873 to Robinson et al. discloses the production of a fluorozirconate glass doped with chlorine by chemical vapor deposition.

U.S. Pat. No. 4,334,903 to MacChesney et al. relates to the production of a silicon glass optical fiber having a graded index profile by chemical vapor deposition of reactant gases, varying the mixture of dopants and glass forming materials with the deposition of successive layers. U.S. Pat. No. 4,242,375 to Shiraishi et al. discloses the reaction of $SiF_4$ and $H_2O$ on a heated silica optical fiber substrate to produce a new layer of silicon doped with fluorine. U.S. Pat. No. 3,718,383 to Moore discloses the diffusion of an organic material into a plastic element to form a plastic optical element having a refractive index gradient.

The casting techniques and the other methods disclosed in the references do not overcome the problem of scattering loss caused to flaws in the fibers. A technique is, therefore, needed which can supress the scattering defects which are generally observed in glass optical fibers produced using these techniques.

SUMMARY OF THE INVENTION

It is, therefore, an object of the present invention to provide a method for producing glass fibers which will reduce scattering losses due to flaws and impurities in the fibers.

It is another object of the present invention to provide a reactive vapor transport and deposition process for reducing scattering losses.

It is a further object of the present invention to provide a glass fiber with a high refractive index.

These and other objects are achieved by passing reactive gases through a rotating mold containing molten glass. The gases react with the inner wall of the molten glass to remove impurities that cause scattering losses and increase the refractive index of the resulting fiber.

In the preferred embodiment, fluoride glass starting materials are placed in a rotating mold and the temperature is raised sufficiently to melt the glass material. The mold is rotated at a speed sufficient to cause the glass melt to form a hollow glass tube inside the mold. Reactive gases are passed through the mold to purge the material of water, hydroxides and other impurities. After the impurities have been removed, reactive gases are blown through the mold to react with the glass material and reduce the refractive index on the inner wall of the glass tube. The mold is cooled and a preform, which can later be drawn into glass fibers, is formed from the resulting material.

Other objects, advantages, and novel features of the present invention will become apparent from the following detailed description of the invention.

DETAILED DESCRIPTION OF THE INVENTION

Figure 1:
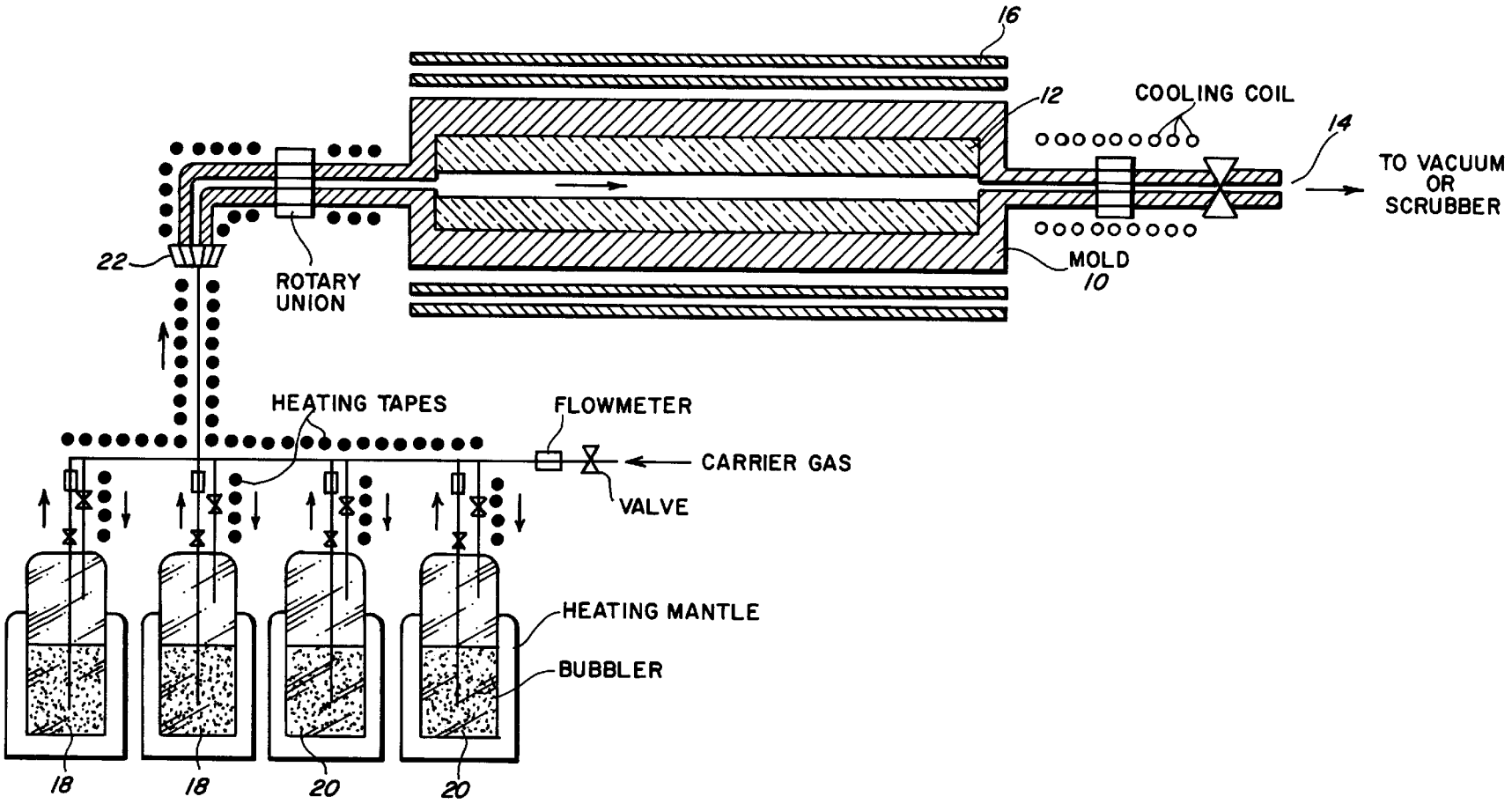
FIG. 1 is a cross-sectional view of the apparatus used for the Reactive Vapor Transport Process (RVT).

A new method for preparing low loss multimode and monomode glass optical fibers which avoids casting or pouring the core and clad melts is disclosed. The new technique is based on a reactive-gas-transport approach which avoids contamination from absorbing impurities and scattering centers such as bubbles, dust particles, microcrystals, phase separation, striae, and core-clad defects which are generally formed upon casting the glass melt. A diagram of the newly developed Reactive Vapor Transport approach (RVT) is shown in FIG. 1. It consists of a rotating mold 10 which contains the glass melt 12. The mold is made out of platinum, gold, graphite, vitreous carbon, or other suitable material, and is equipped with gas entry 22 and exit 14 ports. All glass systems with a viscosity equal to or less than 10 poises at or above the crystallization temperature can be cast using the present rotational casting process. In particular, the process can be used with fluoride, chloride, bromide, fluorophosphate, and mixed halide glasses. Fluoride, chloride, and bromide glasses are preferred with fluroide glasses being most preferred. The rotating melt is heated to between 500° C. and 1000° using heating rods 16 and rotated at a rate sufficient to form a hollow tube inside the mold. When the melt is homogenized and refined, it is purged with one or more reactive gases 18 to remove hydroxides molecular water, and other impurities present in the melt. Any reactive gas or mixture of gases which can remove the impurities can be used in the present process.

$SF_6$, $NF_3$, $F_2$, and $CF_4$ are preferred with $SF_6$ being most preferred. Subsequently, one or more reactive gases 20 are blown through past the melt and are allowed to diffuse, mix, and react with the surface of the molten glass. Any reactive gas or mixture of gases which can react with the glass to produce a higher refractive index can be used in the present process. HCl, HBr, HI, $Cl_2$, $Br_2$, $I_2$, $SnI_2$+Ar, $BiI_3$+Ar, $SnBr_2$+Ar, $BiBr_3$+Ar, $BiF_3$+Ar, $PF_5$+$Br_2$, $PF_5$+$Cl_2$ are preferred with HCl, HBr, HI, $Cl_2$, $Br_2$, and $I_2$ being most preferred. The gas must be selected such that the halogen in the gas does not correspond to the halogen in the glass, i.e. HCl gas cannot be used for chloride glasses. Also, the halogen in the gas should have a higher molecular weight than the halogen in the glass, i.e. any of the gases listed can be used with fluoride glasses while only gases with bromine or iodine can be used with chloride glasses. The resulting reaction increases the refractive index to the inner wall of the melt. After the core region is formed, the rotating mold is rapidly quenched to the glass transition temperature using a metal brushing or other suitable means. The resulting tube preform can then be drawn into fibers.

Figure 2:
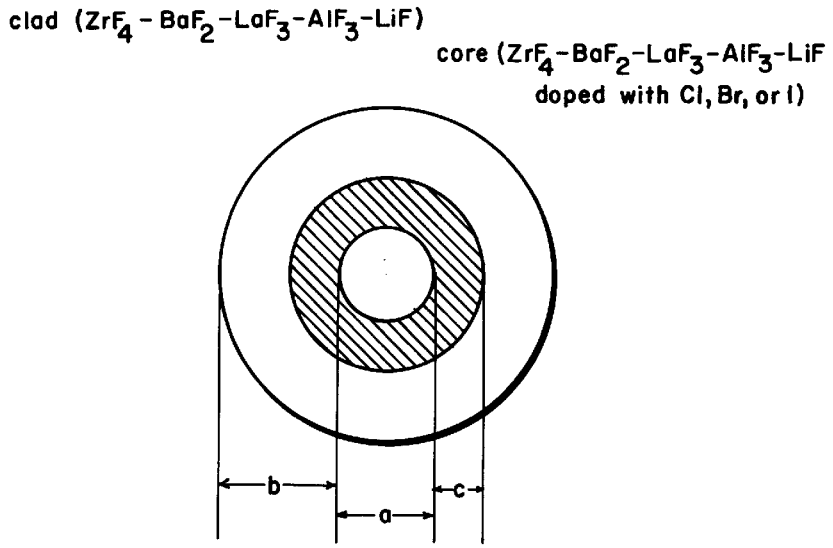
FIG. 2 is a cross-sectional view of an RVT tube preform formed according to the present invention.

A cross-sectional view of an RVT tube preform is shown in FIG. 2. The thickness of the core can be readily controlled by diffusion and mixing parameters such as gas flow rates, melt temperature, exchange rate, quenching rate, and mold heat capacity. The extent of the increase in index of refraction can also be controlled by the nature of the reactive gases used, and the exchange time and temperature.

Figure 3:
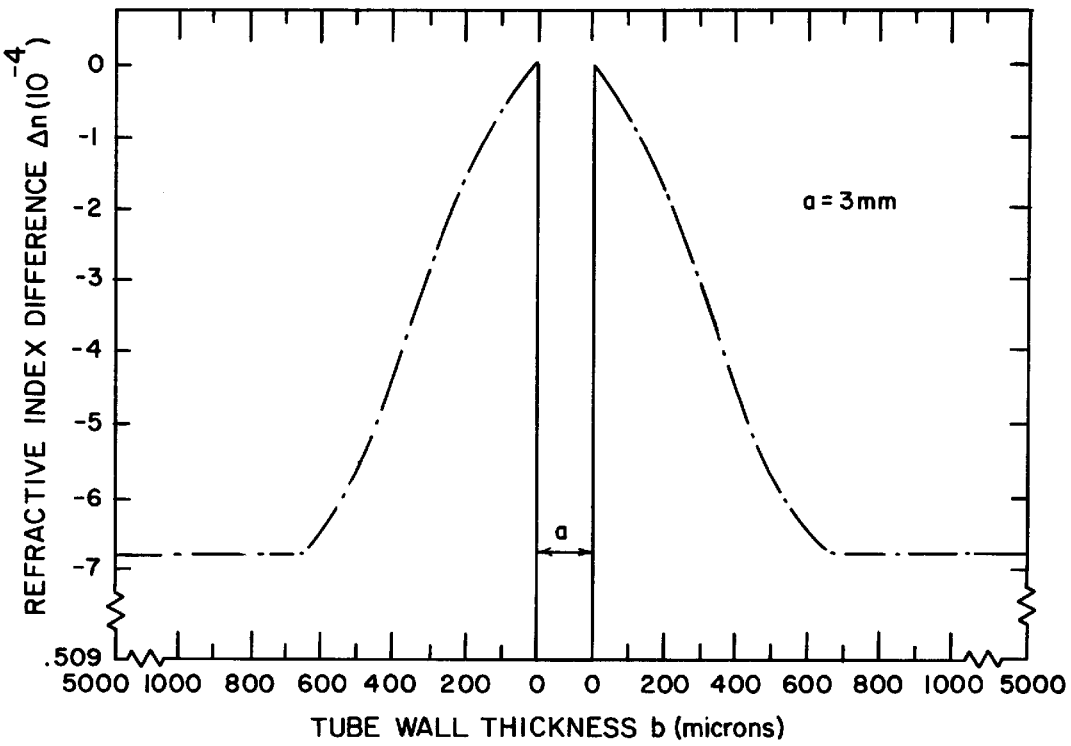
FIG. 3 is a graph showing the index profile of a RTV tube preform.

To show feasibility of the reactive gas transport approach, ion-exchange experiments where carried with $ZrF_4$-$BaF_2$-$LaF_3$-$AlF_3$-LiF melts and the following reactive gases or mixture of gases: HCl, HBr, HI, $Cl_2$, $Br_2$, $I_2$, $SnI_2$+Ar, $BiI_3$+Ar, $SnBr_2$+Ar, $BiBr_3$+Ar, $BiF_3$+Ar, $PF_5$+$Br_2$, $PF_5$+$Cl_2$. The refractive index profile of a RVT tube thus obtained is shown in FIG. 3 where the difference in indices n=[ni-n(b)] is plotted against b; where ni represents the measured index at the inner wall of the tube and b is the overall tube thickness. The small core and the parabolic index profile thus obtained make possible the fabrication of both single mode and graded-index glass fibers by RVT processing. The results also showed that substantial increase in refractive index ( n) was obtained with chlorine and bromine compounds. Namely, n as high as 0.01 was obtianed when the base glass was treated with $PF_5$+$Br_2$, $PF_5$+$Cl_2$, HBr, or HCl at 1000° C. for less than 5 min; and no crystals and density variations were observed in the treated glass samples. Furthermore, the addition of $PF_5$ to the base fluoride glass has drastically increased the glass stability; namely, an increase of 20° C. in the glass working range was observed.

Figure 4:
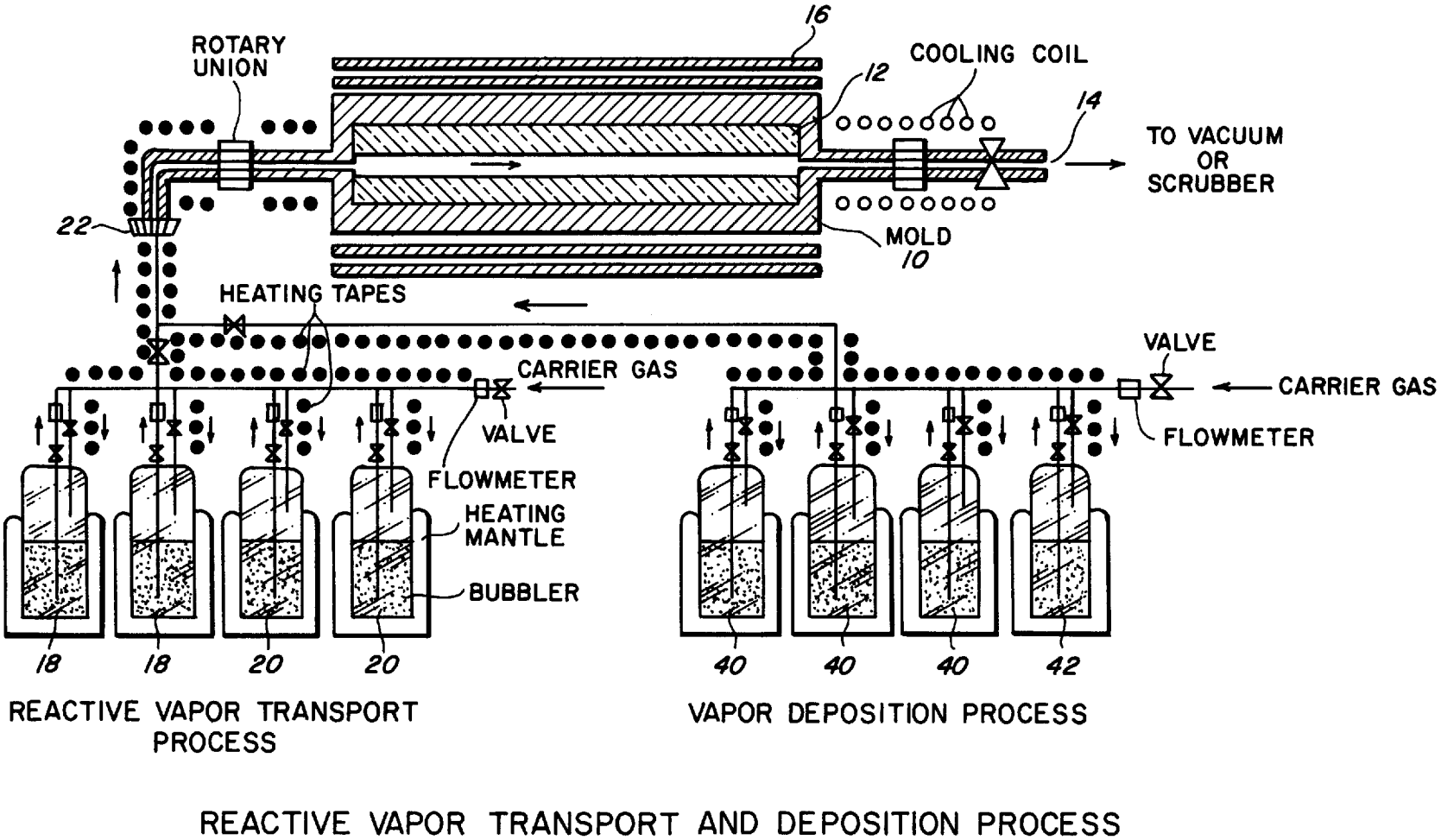
FIG. 4 is a cross-sectional view of the apparatus used for the Reactive Vapor Transport Deposition Process (RVTD).

The feasibility of forming a core inside a glass tube using the Reactive Vapor Transport process has allowed, the the first time, the incorporation of a complete vapor deposition approach in the preparation of glass preforms termed Reactive Vapor Transport and Deposition process (RVTD). This vapor process will essentially minimize the fiber absorption losses. A diagram of the RTVD is shown in FIG. 4. Starting materials with high vapor pressure or low sublimation temperatures are stored in bubblers 44; these starting chemicals are derived from metal chlorides, metal bromides, metal iodines, and organo-metallic compounds such as $ZrCl_4$, $ZrCl_2$, $ZrCl_3$, $ZrBr_2$, $ZrBr_3$, $ZrBr_4$, $ZrI_4$, Ba ($C_{10}H_{19}O_2$), $BaI_2$, $AlCl_3$, $AlBr_3$, Al (sec-butoxide), $LaI_3$, $PbBr_2$, and $LiNH_2$. Proper amounts of the starting chemicals are sublimed by heating bubblers 44 and are carried inside a cold rotating mold using Argon or other suitable inert gas as a carrier gas. The cold mold cools the material and causes it to be deposited om the inner surface of the mold. The absorbing impurities having very low vapor pressure will stay behind in the bubblers. Subsequently, the raw materials are fluorinated with flowing HF contained in bubbler 46. When the halogenation step is completed, the mold temperature is raised to 500° C.–1000° C. for melting. And finally, the RVTD technique described earlier is used to produce the core.

The invention having been generally described, the following examples are given as particular embodiments of the invention and to demonstrate the practice and advantages thereof. It is understood that the examples are given by way of illustration and are not intended to limit the spefication or the claims to follow in any manner.

EXAMPLE I 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ HCl was introduced into the rotating glass to activate the ion-exhange process. The Ar-HCl mixture flowrate was set at 1 SCFH. After 4 minutes, the Ar-HCl flow was stopped, and the glass tube was purged for 2 minutes with Ar. The tube was annealed at 250° C. for 2 hrs.

EXAMPLE II 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ HCl was introduced into the rotating glass to activate the ion-exhange process. The Ar-HCl mixture flowrate was set at 1 SCFH. After 1 minute, the Ar-HCl flow was stopped, and the glass tube was purged for 2 minutes with Ar. The tube was annealed at 250° C. for 2 hrs.

EXAMPLE III 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ HCl was introduced into the rotating glass to activate the ion-exhange process. The Ar-HCl mixture flowrate was set at 1 SCFH. After 30 seconds, the Ar-HCl flow was stopped, and the glass tube was purged for 2 minutes with Ar. The tube was annealed at 250° C. for 2 hrs.

EXAMPLE IV 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ HBr was introduced into the rotating glass to activate the ion-exhange process. The Ar-HBr mixture flowrate was set at 1 SCFH. After 4 minutes, the Ar-HBr flow was stopped, and the glass tube was purged for 2 minutes with Ar. The tube was annealed at 250° C. for 2 hrs.

EXAMPLE V 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ HI was introduced into the rotating glass to activate the ion-exhange process. The Ar-HI mixture flowrate was set at 1 SCFH. After 4 minutes, the Ar-HI flow was stopped, and the glass tube was purged for 2 minutes with Ar. The tube was annealed at 250° C. for 2 hrs.

EXAMPLE VI 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ $Br_2$ was introduced into the rotating glass to activate the ion-exhange process. The Ar-$Br_2$ mixture flowrate was set at 1 SCFH. After 4 minutes, the Ar-$Br_2$ flow was stopped, and the glass tube was purged for 2 minutes with Ar. The tube was annealed at 250° C. for 2 hrs.

EXAMPLE VII 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ $I_2$ was introduced into the rotating glass to activate the ion-exhange process. The Ar-$I_2$ mixture flowrate was set at 1 SCFH. After 4 minutes, the Ar-$I_2$ flow was stopped, and the glass tube was purged for 2 minutes with Ar. The tube was annealed at 250° C. for 2 hrs.

EXAMPLE VIII 25 g of Fluoride glass of composition $53ZrF_4$-$19BaF_2$-$5LaF_3$-$3AlF_3$-20 LiF (in mole %) were melted in a platinum crucible, in a resistance furnace, under an Ar atmosphere. The argon flowrate was set at 6 SCFH. The melt was soaked at 850° C. for 45 minutes. The melt was cast into a brass mold and rotated at 2000 rpm. The brass mold was preheated to 250° C. Immediately a stream of gas mixture consisting of ⅔ Ar and ⅓ $Cl_2$ was introduced into the rotating glass to activate the ion-exhange process. The Ar-$Cl_2$ mixture flowrate was set at 1 SCFH. After 4 minutes, the Ar-$Cl_2$ flow was stopped, and the glass tube was purged for 2 minutes with Ar. The tube was annealed at 250° C. for 2 hrs.

The Reactive Vapor Transport process disclosed is used to suppress the numerous scattering defects which are generally observed in cast glass preforms, particularly fluoride glass preforms. The new process has also permitted the graded-index profiling in glass fibers, the preparation of single mode glass fibers, and the prevention and removal of hydroxide contamination by reactive gases. Furthermore, this new process can be extended to a complete vapor phase process using the Reactive Vapor Transport and Deposition technique, thus allowing production of glass fibers free from contamination by absorbing impurities.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent by the United States is:

1. A process for the production of glass fibers, the steps of which comprise;

placing a glass fiber starting material into a rotating mold;

heating said glass fiber starting material in said mold to a temperature sufficient to cause said material to melt;

rotating said mold at a rate sufficient to cause said starting material to form a hollow tube inside said mold;

purging said glass fiber starting material with one or more reactive gases to remove hydroxides, water, and other impurities;

blowing one or more reactive gases through said mold, said gases reacting with said melt to increase the refractive index;

rapidly quenching said mold to the glass transition temperature to form a glass fiber preform; and drawing said preform into a glass fiber.

2. The process of claim 1 wherein the step of placing said glass fiber starting material into said rotating mold comprises placing said glass fiber starting material selected from the group consisting of fluoride, chloride, bromide, fluorophosphate, and mixed halide glasses into said mold.

3. The process of claim 2 wherein the step of placing said glass fiber starting material into said rotating mold comprises placing said glass fiber starting material selected from the group consisting of fluoride, chloride, bromide glasses into said mold.

4. The process of claim 3 wherein the step of placing said glass fiber starting material into said rotating mold comprises placing fluoride glass into said mold.

5. The process of claim 1 wherein said heating step comprises heating said glass fiber starting material to a temperature between about 500°–1000°.

6. The process of claim 1 wherein said purging step comprises purging said glass fiber starting material with reactive gases selected from the group consisting of $SF_6$, $NF_3$, $F_2$, and $CF_4$.

7. The process of claim 2 wherein said blowing step comprises blowing reactive gases selected from the group consisting of HCl, HBr, HI, $Cl_2$, $Br_2$, $I_2$, $SnI_2$+Ar, $BiI_3$+Ar, $SnBr_2$+Ar, $BiBr_3$+Ar, $BiF_3$+Ar, $PF_5$+$Br_2$, and $PF_5$+$Cl_2$ through said mold.

8. The process of claim 7 wherein said said blowing step comprises blowing reactive gases selected from the group consisting of HCl, HBr, HI, $Cl_2$, $Br_2$, and $I_2$ through said mold.

9. A process for the production of glass fibers, the steps of which comprise;

heating a glass fiber starting material to a temperature sufficient to cause said material to sublime;

transporting said material to a cold rotating mold using an inert carrier gas;

cooling said material thereby causing said material to deposit on the inner surface of said mold;

halogenating said materials to produce a glass fiber material;

heating said material to a temperature above said glass fiber materials melting point;

purging said material with reactive gases;

blowing one or more reactive gases through said mold, said gases reacting with said melt to increase the refractive index;

rapidly quenching said mold to the glass transition temperature to form a glass fiber preform; and drawing said preform into a glass fiber.

10. The process of claim 9 wherein said heating step comprises heating said glass fiber starting material selected from the group consisting of metal chlorides, metal bromides, metal iodines, and organo-metallic compounds.

11. The process of claim 10 wherein said heating step comprises heating said glass fiber starting material selected from the group consisting of such as $ZrCl_4$, $ZrCl_2$, $ZrCl_3$, $ZrBr_2$, $ZrBr_3$, $ZrBr_4$, $ZrI_4$, Ba ($C_{10}H_{19}O_2$), $BaI_2$, $AlCl_3$, $AlBr_3$, Al (sec-butoxide), $LaI_3$, $PbBr_2$, and $LiNH_2$.

12. The process of claim 9 wherein said heating step comprises heating said glass fiber starting material to a temperature between about 500°–1000°.

13. The process of claim 9 wherein said halogenating step comprises reacting said glass fiber starting material with a halogen gas, said halogen in said halogen gas having a higher molecular weight than the halogen in the glass.

14. The process of claim 9 wherein said purging step comprises purging said glass fiber starting material with reactive gases selected from the group consisting of $SF_6$, $NF_3$, $F_2$, and $CF_4$.

15. The process of claim 9 wherein said blowing step comprises blowing reactive gases selected from the group consisting of HCl, HBr, HI, $Cl_2$, $Br_2$, $I_2$, $SnI_2$+Ar, $BiI_3$+Ar, $SnBr_2$+Ar, $BiBr_3$+Ar, BiF3+Ar, $PF_5$+$Br_2$, and $PF_5$+$Cl_2$ through said mold.

16. The process of claim 15 wherein said blowing step comprises blowing reactive gases selected from the group consisting of HCl, HBr, HI, $Cl_2$, $Br_2$, and $I_2$ through said mold.

17. An apparatus for producing glass optical fibers, comprising:

a rotating mold for containing a glass melt, said mold having gas entry and gas exit ports;

means for rotating said mold;

means for heating said mold to a temperature sufficient to produce said glass melt; and means for supplying gases to said mold through said gas entry port.

18. The apparatus of claim 17 wherein said rotating mold is made from a material selected from the group consisting of platinum, gold, graphite, or vitreous carbon.

19. The apparatus of claim 17 wherein said means for heating said mold is heating rods, said heating rods being capable of heating said mold to a temperature between 500°–1000° C.

20. The apparatus of claim 19 wherein said means for supplying gases to said mold comprises a plurality of bubblers from which reactive gases or liquid vapors and glass optical fiber starting materials can be transported to said mold by a carrier gas, said bubblers having a heating means for controlling the temperature of said bubblers.

21. The apparatus of claim 20 wherein said heating means for controlling the temperature of said bubblers is selected from the group consisting of heating tape and heating mattles.

22. The product of the process of claim 1.

23. The product of the process of claim 9.

* * * * *